(12) United States Patent
Faust, Jr. et al.

(10) Patent No.: US 8,394,872 B2
(45) Date of Patent: Mar. 12, 2013

(54) METHOD OF REDUCING THE VISCOSITY OF HYDROCARBON FLUIDS

(75) Inventors: Marcus D. Faust, Jr., Houston, TX (US); Austen K Flatt, Sugar Land, TX (US); Thomas M. Weathers, Jr., Katy, TX (US); Duy T. Nguyen, Houston, TX (US)

(73) Assignee: Nalco Company, Naperville, IL (US)

( * ) Notice: Subject to any disclaimer, the term of this patent is extended or adjusted under 35 U.S.C. 154(b) by 212 days.

(21) Appl. No.: 12/500,644

(22) Filed: Jul. 10, 2009

(65) Prior Publication Data

US 2011/0009556 A1 Jan. 13, 2011

(51) Int. Cl.
 *C09K 3/00* (2006.01)
(52) U.S. Cl. ........................................... 523/175
(58) Field of Classification Search .................... 523/175
 See application file for complete search history.

(56) References Cited

U.S. PATENT DOCUMENTS

| 2004/0072946 A1 | 4/2004 | Eagland et al. |
| 2005/0034862 A1 | 2/2005 | Nguyen |
| 2005/0049327 A1* | 3/2005 | Jovancicevic et al. ........ 523/175 |
| 2009/0170730 A1 | 7/2009 | Wu et al. |

FOREIGN PATENT DOCUMENTS

| EP | 1 033 471 A1 | 9/2000 |
| EP | 1 961 799 A1 | 8/2008 |
| GB | 1 188 781 | 4/1970 |
| JP | 2005-133075 | 5/2005 |
| WO | WO 2004/050791 A1 | 6/2004 |
| WO | WO 2005/040669 A1 | 5/2005 |

OTHER PUBLICATIONS

"Down-Hole Emulsification for Improving Viscous Crude Production", R. Simon, W.G. Poynter, Journal of Petroleum Technology, pp. 1849-1853, Dec. 1968.
"The Replacement of Hydrocarbon Diluent With Surfactant and Water for the Production of Heavy, Viscous Crude Oil", G.G. McClaflin, C.R. Clark, T.R. Sifferman, Journal of Petroleum Technology, pp. 2258-2264, Oct. 1982.
Pumping heavy oils with the aid of downhole oil-in-water emulsifications, C.M. Des Brisay, D.W. Mudie, F.M. Mourits, L. Kurucz, The Journal of Canadian Petroleum Technology, vol. 28. No. 2, pp. 80-84, Mar.-Apr. 1989.
Transport of Viscous Crudes as Concentrated Oil-in-Water Emulsions, L.E. Sanchez, J.L. Zakin, Ind. Eng. Chem. Res., vol. 33, No. 12, pp. 3256-3261, 1994.
"Downhole Emulsification: Viscosity Reduction Increases Production", G.E. Browne, G.R. Hass, R.D. Sell, The Journal of Canadian Petroleum Technology, vol. 35, No. 4, pp. 25-31, Apr. 1996.
"Heavy Crude Oil Viscosity Reduction for Pipeline Transportation", B. M. Yaghi, A.Al-Bemani, Energy Sources, 24, 93-102, 2002.

* cited by examiner

*Primary Examiner* — Edward Cain
(74) *Attorney, Agent, or Firm* — Edward O. Yonter; Andrew D. Sorensen

(57) ABSTRACT

A method for reducing the viscosity of a hydrocarbon fluid encountered in petroleum operations is disclosed. The method includes contacting the hydrocarbon fluid with an effective amount of a composition comprising at least one polymer having at least 25 mole percent cationic monomers.

19 Claims, 4 Drawing Sheets

METHOD OF REDUCING THE VISCOSITY OF HYDROCARBON FLUIDS

TECHNICAL FIELD

This invention relates generally to methods of preparing low-viscosity oil-in-water emulsions from viscous hydrocarbon fluids encountered in petroleum operations. More specifically, the invention relates to methods of enhancing the recovery and transport of heavy petroleum oils. The invention has particular relevance to contacting hydrocarbon fluids encountered in petroleum operations with one or more polymers having at least 25 mole percent cationic monomers to create simple or complex emulsions thereby reducing the apparent viscosity of the hydrocarbons to increase transport efficiency.

BACKGROUND

Of the worlds proven oil reserves, over half are considered heavy oil and many of these are new production areas with rapidly evolving technology and new demands. One of the most challenging aspects of such heavy oil production is the transport of these highly viscous fluids. Transport of viscous fluids along pipelines for crude oil production, delivery to a refinery, or other storage facility presents a myriad of challenges. One major challenge is recovering and transporting high viscosity petroleum products from well sites to refineries or storage facilities. In many proven petroleum-containing sites, very little petroleum may be obtained by known means because of the high viscosity of the petroleum products.

When extracted from the subterranean formation, the viscous oil must be transported from the field to a refinery or shipping terminal. Various techniques are known for aiding in the recovery of viscous petroleum and facilitating its transport to a refinery, storage site, or other location. These techniques include, for example, mechanical pumping, mechanical pumping combined with steam injection, and mining. Pumping unit limitations have a negative impact on the economics of producing viscous oil from pumped wells found in many parts of the world. The high viscosity of these crude oils results in low pump volumetric efficiency, reduced flow rates, and high flow pressure drop.

Heavy oils exhibit a viscosity generally from 10,000 to 500,000 cP at room temperature. As a result, according to current practice pumping and heating stations are used to maintain a low viscosity for transport along pipelines. However, prolonged pumping interruptions often occur resulting in cold crude oil with concomitant plugging of pipes and pumps. Insulating hundred of miles of pipe to reduce heat loss is usually cost prohibitive. Heating the crude oil likewise consumes a large amount of energy and is cost ineffective. Diluents (e.g., fuel oil or kerosene) are sometimes used to reduce viscosity for pumping and transport. However, the large amount of diluent required is not readily available in the production area and, furthermore, in existing practices, the diluent has to be recovered at the fluid delivery site and pumped back to the field over great distances.

Current production of heavy oils (defined herein as having an API gravity of 20 or less) from the subterranean formation to the processing facilities results in significant pressure drop, fatigue of pumping equipment, and low fluid flow production rates due to the high viscosity of the crude oil component of the production fluid.

There thus exists an ongoing need for improved methods to decrease the apparent viscosity of produced fluids to improve pump performance and operating efficiency thereby enhancing production. There exists a specific need for enhancing recovery and transport of viscous and extremely viscous petroleum such as that found in heavy oil reservoirs and other deposits.

SUMMARY

This invention accordingly relates to improved methods of reducing the apparent viscosity of hydrocarbon fluids encountered in petroleum operations to facilitate the flow of such fluids between two locations. In a preferred aspect, the invention relates to reducing the apparent viscosity of petroleum products, such as heavy oil and crude oils, to facilitate its transport out of the subterranean formation or between the site of recovery (e.g., oil well) and a refinery or storage facility. In another preferred aspect, the present invention is a method for the preparation of low apparent viscosity oil-in-water emulsions from viscous oils. These emulsions, in turn, will increase the oil production and provide a cost-effective alternative to heated pipelines or diluents for transportation of heavy oil.

In one embodiment, the invention provides a transport mechanism where the production fluid is emulsified into the internal phase of an oil-in-water emulsion by adding water and a polymeric surfactant to the production fluid followed by mixing of all components. The resulting emulsion has an apparent viscosity much closer to water and as such has greatly reduced drag coefficient, which in turn reduces the pressure drop as fluids are pumped to, for example, processing facilities.

In an aspect, the invention relates to a method of reducing the apparent viscosity of hydrocarbon fluids encountered in petroleum operations. In an embodiment, the invention includes a method of reducing the apparent viscosity of hydrocarbon fluids encountered in petroleum operations. The method includes contacting the hydrocarbon fluid with an effective amount of a composition comprising at least one polymer having at least 25 mole percent cationic monomers. Preferably, the method includes contacting the hydrocarbon fluid with one or more of the described polymers to facilitate transport of the fluid along a fluid flow path to a refinery or other storage site. Preferably, the invention relates to an enhanced process for reducing the apparent viscosity of hydrocarbons such as heavy oil and crude oils. The present invention involves contacting the polymers herein described with a hydrocarbon fluid to convert the hydrocarbon fluid from high viscosity oil or water-in-oil emulsions to low apparent viscosity oil-in-water emulsions or complex water external emulsions, resulting in increased productivity.

This invention provides novel methods of applying aqueous solutions of cationic polymers to a hydrocarbon solution to create a water external emulsion to reduce the apparent viscosity of the fluid. The water external emulsion can be broken and emulsified fluids can be separated into aqueous and hydrocarbon fractions, for example, by heating the emulsion to a temperature at which the ester linkages in the cationic polymer hydrolyze in the presence of water to modify the polymer interaction at the oil/water interface.

The invention is envisioned to operate in all applications as related to the oil field (e.g., subterranean reservoir, pipeline, production facility, crude oil mixtures). For example, petroleum operations refer generally to any primary, secondary, and tertiary oil recovery system. The method of the invention may be employed by contacting the described polymers with or adding the polymers to the hydrocarbon fluids in a manner known per se. In a preferred method of this invention, the polymers of the invention are added at any point in the flow line upstream from the point at which reduced viscosity is desired. An exemplary technique in primary oil recovery where the method of the invention may employed is the squeeze treating technique, whereby the polymers are injected under pressure into the producing formation, are adsorbed on the strata, and desorbed as the fluids are produced. They can further be added in the water flooding operations of secondary oil recovery as well as be added to pipelines, transmission lines, and refinery units.

In one embodiment, the disclosed composition is injected down the annular space of the well, where polymers contact the produced fluids at the base of the production tubing. In another embodiment, the disclosed composition is added to the produced fluid via slip-stream.

In certain instances, the described polymers may also be formulated with other materials commonly used for treating hydrocarbon fluids and oil in water emulsion encountered in petroleum operations. Such other materials include, but are not limited to corrosion inhibitors, scale inhibitors, surfactants, other treatment formulations, combinations, and the like.

It is an advantage of the invention to provide a novel method of reducing pressure drops observed in transporting heavy and viscous crude oil resulting in increased production and improved efficiency of recovering oil from oil-in-water emulsions after transport.

Another advantage of the invention is to provide well clean-up and removal of heavy deposits in the well bore to further enhance production.

An additional advantage of the invention is to provide a method for the formation of low apparent viscosity water external emulsions that can be separated into dry oil and water upon exposure to emulsion breaking chemical and/or heat.

It is another advantage of the invention to provide a novel method of reducing the apparent viscosity of hydrocarbon fluids encountered in petroleum operations to facilitate transfer of such fluids to refineries or other storage sites.

It is a further advantage of the invention to provide a method of forming oil-in-water emulsions by contacting a polymer composition having a mixture of non-ionic and cationic monomers with hydrocarbon fluids encountered in petroleum operations thereby reducing the apparent viscosity of the hydrocarbon fluids and increasing transport efficiency.

An additional advantage of the invention is to provide a novel method that obviates the need for diluents and heated pipelines in the transport of hydrocarbon fluids encountered in petroleum operations.

Another advantage of the invention is to reduce equipment wear, increase oil production, extend reservoir production lifetime, and generally increase production efficiency and oil quality.

A further advantage of the invention is to provide enhanced separation of oil and water based upon a synergistic effect resulting from lower water content emulsions and reduced emulsion breaker chemical usage.

It is yet another advantage of the invention to provide methods of reducing the apparent viscosity of hydrocarbon fluids encountered in petroleum operations that are able to function with lower foaming than prior art surfactants and that are immune to the salinity levels of the water in the system.

Additional features and advantages are described herein, and will be apparent from, the following Detailed Description, Examples, and Figures.

DETAILED DESCRIPTION

Figure 1:
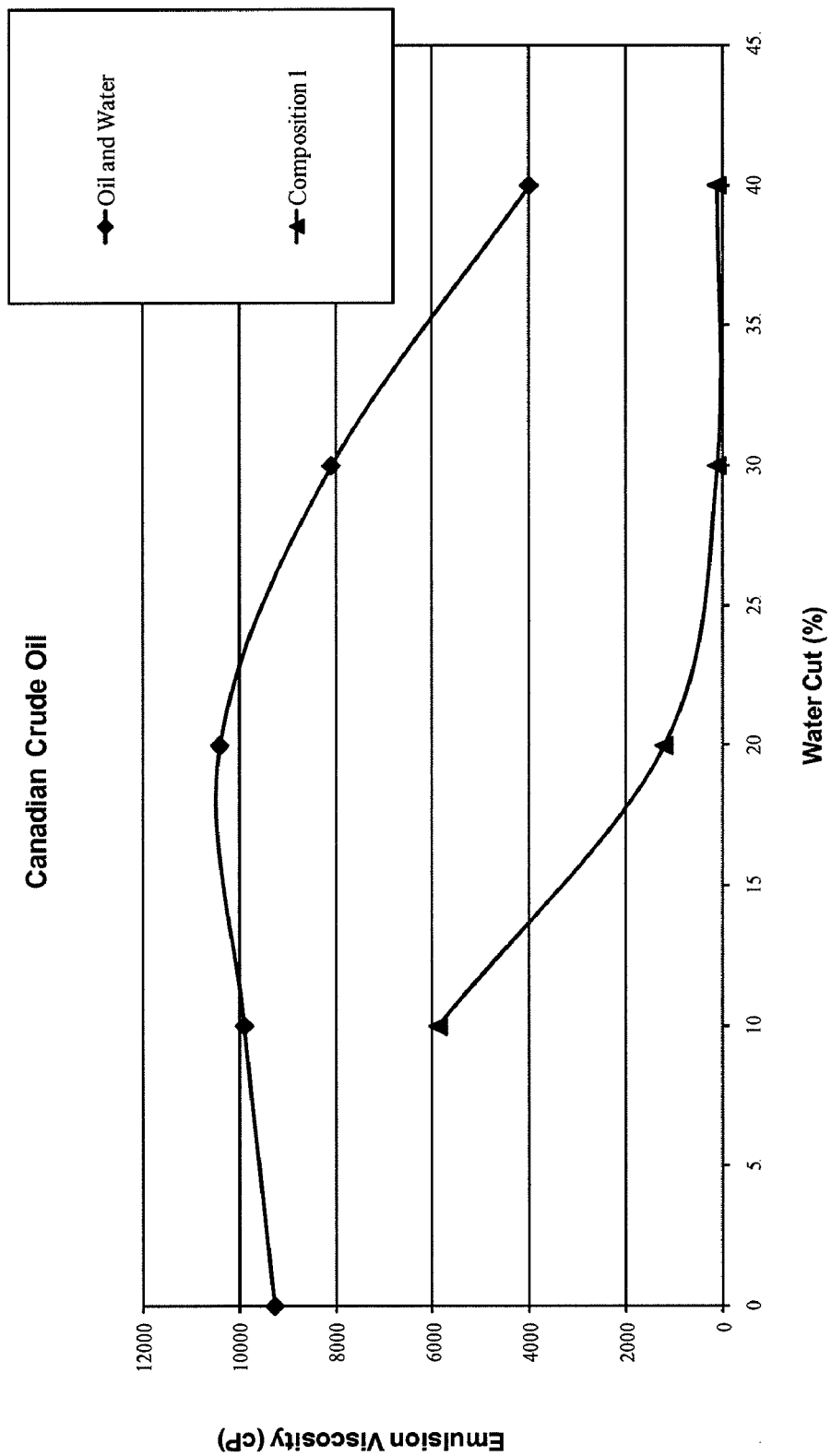
FIG. 1 is a graph that illustrates the effectiveness of the present invention at reducing viscosity of crude oil in a range of water cuts.

In a preferred embodiment, delivery of the cationic polymeric material is accomplished through preparation of a salt precipitated slurry. An exemplary method of preparing such a slurry includes adding the polymer in dry powder form to a solution of brine containing 20% ammonium sulfate (or one or more equivalent highly water soluble salts). A second exemplary method of preparing the slurry includes mixing the reactive monomers with the salt(s) to trigger formation of a collapsed polymeric chain that results in a slurry. Such methods and other methods of preparing slurries are known in the art. Any suitable method may be chosen and utilized by a skilled artisan in applying the invention.

In another embodiment, the polymer slurry can be freezing point depressed using additional ammonium chloride salts for use in cold regions without affecting the performance of the chemical. The dry powder version may also be used, but generally would require a pretreatment system to create enough shear force and provide sufficient time to hydrate the polymer prior to its delivery to the oil/water interface. An alternate delivery method is to use a slip-stream method to send produced water with some residual oil and cationic polymer back down-hole. This slip-streaming method would reduce overall chemical usage as part of the chemical would be recycled.

In a further embodiment, treatment of the formed emulsion and separation of the water from the oil typically goes through a multiple stage separation that has a free water knock-out (FWKO) followed by a heat treating step. The heat treating step and the FWKO can both be heated and as such could both trigger the hydrolysis of the ester groups in the cationic polymer and resulting destabilization of the emulsion to recover the emulsified oil and further enhance oil/water separation.

In an embodiment, the weight average molecular weight of the polymers of the invention is from about 500,000 kDa to about 10 million kDa. More preferably, the molecular weight range is from about 1 to about 5 million kDa.

The preferred dose range for this invention is from about 10 to about 5,000 ppm or from about 10 to about 3,000 ppm, as polymer actives based on total volume of emulsion. The more preferred dose range is from about 50 to about 1,000 ppm, as polymer actives based on total volume of emulsion. Most preferably, the dose range is from about 50 to about 500 ppm, as polymer actives based on total volume of emulsion.

It should be appreciated that the polymers of the invention may be polymerized using any suitable method. Representative methods include batch polymerization using both radical and redox pair initiators, salt precipitation using both radical and redox pair initiators, latex or inverse latex polymerization using both radical and redox pair initiators, or any other suitable method.

In alternative embodiments, the range of cationic monomers in the disclosed polymer of the invention is from about 25 to about 100 mol %. The preferred range of cationic monomers is from about 40 to about 95 mol %. The most preferred range of cationic monomers is from about 60 to about 90 mol %. Similarly, a preferred range for nonionic monomers is up to about 75 mol %, the more preferred range is from about 5 to about 60 mol %, and the most preferred range is from about 10 to about 40 mol %. For example, the polymer of this invention may include almost 100 mol % cationic monomers, such as 8/48/42 Acam/DMAEA-BCQ/DMAEA-MCQ. Alternatively, it may include almost 50 mol % nonionic monomer, such as 40/20/40 Acam/DMAEA-BCQ/DMAEA-MCQ. Both formulations, and similar formulations, are able to form low viscosity oil in water emulsions.

"Cationic Monomer" means a monomer which possesses a net positive charge. Preferred cationic monomers include dimethylaminoethylacrylate alkyl salts; cationic monomers having four carbons bonded to a single nitrogen to form a quaternary ammonium ion; cationic monomers having two carbons singly bonded to a single nitrogen and one carbon doubly bonded to the nitrogen to form a quaternary imminium ion; cationic amine monomers with a $C_1$ to $C_{24}$ alkyl chain or benzyl salts; the like; and combinations thereof.

Additional representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt; dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride; monomers having an aromatic group such as phenyl, benzyl, naphthyl, pyridyl, and the like; and combinations thereof. Alkyl groups are generally $C_1$ to $C_{24}$.

In one embodiment, at least a portion of the cationic monomers are hydrophobically modified cationic monomers. Preferred hydrophobic groups are selected from the group consisting of: N,N-dimethyl aminoethyl acrylate quaternary amine salts having benzyl, substituted benzyl, or alkyl chains of $C_4$ or higher.

A preferred cationic monomer is of the formula below, where $R_1$ is H or methyl, $R_2$ is an alkyl or benzyl, and X is any counterion (e.g., Cl, Br, $SO_4$, and the like). "Alkyl" as used herein refers to a monovalent group derived from a straight or branched chain saturated hydrocarbon by the removal of a single hydrogen atom. Representative alkyl groups include methyl; ethyl; n- and iso-propyl; n-, sec-, iso-, and tert-butyl; eicosanyl ($C_{20}$); heneicosanyl ($C_{21}$); docosyl (behenyl, $C_{22}$); tricosanyl ($C_{23}$); tetracosanyl ($C_{24}$); pentacosyl ($C_{25}$), 3-, 7-, and 13-methylhexadecanyl, and the like. Preferred alkyls include methyl, ethyl, and propyl.

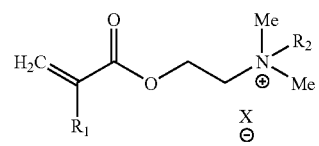

In one embodiment, benzyl has the following structure, where $R_3$, $R_4$, $R_5$, $R_6$, and $R_7$ are independently H or alkyl. This moiety is then attached to the quaternary ammonium center to provide an alkyl-benzyl quaternary ammonium and is attached to the quaternary ammonium through a single carbon bridge.

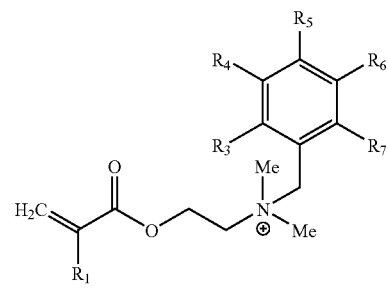

Another preferred cationic monomer has the following formula (i.e., a methyl amine salt of a five- or six-member ring), where $R_1$ is H or alkyl, n is 1 or 2, and X is any counterion.

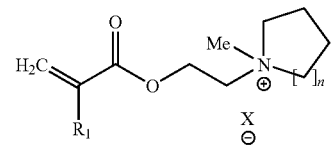

In another embodiment, the cationic monomer has the following formula, where $R_1$ is H or methyl; $R_8$, $R_9$, $R_{10}$, $R_{11}$, and $R_{12}$ are independently H or alkyl; and X is any counterion.

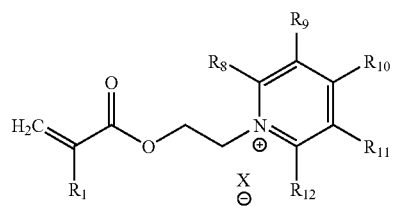

In a further embodiment, the cationic monomer is formed from a nonionic monomer having a charged crosslinked moiety. For example, a reactive group (e.g., chloride) pendant to the backbone may allow for crosslinking with an amine group. Alternatively, the polymer backbone may include pendant tri-substituted amines and be crosslinked with a didihaloalkyl crosslinker. See representative reaction schemes 1 and 2 below.

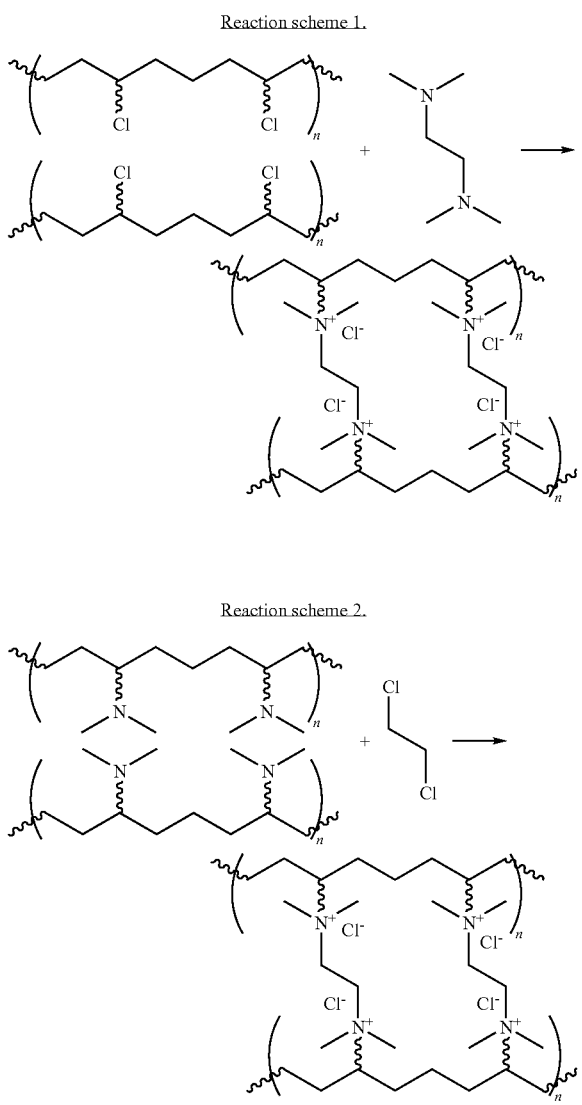

Reaction scheme 1.

Reaction scheme 2.

"Nonionic monomer" means a monomer which is electrically neutral. Representative nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly (ethylene glycol)monomethyl ether mono(meth)acrylate, N-vinyl-2-pyrrolidone, glycerol mono((meth)acrylate), 2-hydroxyethyl(meth)acrylate, 2-hydroxypropyl(meth)acrylate, vinyl methylsulfone, vinyl acetate, glycidyl(meth)acrylate, and the like.

The emulsion may be broken through any method known to one skilled in the art. In one method, the emulsion may be broken via polymer degradation through cleavage of the polymer backbone. Polymer oxidative cleavage, for example, is commonly performed using an oxidant such as sodium perchlorite or bleach in water to sever the polymer backbone and provide a smaller molecule that loses many of the physical properties associated with the polymers. Such emulsion breakage is also possible in oilfield applications and is commonly performed in oxidative cleavage of guar polymers used in the formation stimulation via hydraulic fracturing with polymer gels. Once oxidized, the gel becomes a less viscous fluid with a different set of physical characteristics.

The foregoing may be better understood by reference to the following examples, which are intended for illustrative purposes and are not intended to limit the scope of the invention.

EXAMPLE 1

As an initial screening, two different polymer compositions were analyzed to determine their ability to reduce the apparent viscosity of crude oil at various concentrations. The use of cationic polymer material (Composition 1) composed of acrylamide (Acam), N,N-dimethyl aminoethyl acrylate-benzyl chloride quat (DMAEA-BCQ), and N,N-dimethyl aminoethyl acrylate-methyl chloride quat (DMAEA-MCQ), was found to provide significant viscosity reduction at a range of dosages and water cuts. Data collected using Composition 1 (11:61:28 Acam:DMAEA-BCQ:DMAEA-MCQ) shows greater than 80-percent viscosity reduction as well as a dynamic range of water contents in which the viscosity is reduced (see Table 1).

TABLE 1

|  | Crude Only | Composition 1 | Composition 1 | Composition 1 |
| --- | --- | --- | --- | --- |
| Dosage (ppm) | 0 | 1,000 | 500 | 200 |
| Water (vol %) | 20 | 20 | 20 | 20 |
| Viscosity - start (cP) | — | — | 3,839 | 3,559 |
| Viscosity - end (cP) | 10,408 | 1,217 | 3,689 | 5,029 |

EXAMPLE 2

The effectiveness of the present invention at reducing viscosity is demonstrated in this example based on the amount of water added to the crude oil and is limited to a minimum of 10 percent water to maintain a readily flowing emulsion with significantly lower viscosity (see FIG. 1).

EXAMPLE 3

The high molecular weight cationic polymers of Composition 1 provide a unique class of polymers that have a high cationic charge density based on quaternary amines (e.g., methyl chloride quats and benzyl chloride quats) with high molecular weight (generally the weight average molecular weight ($M_W$) is between 5 million and 15 million kDa calculated using the formula $M_W = \Sigma(N_i M_i^2)/\Sigma(N_i M_i)$, where $N_i$=the number of molecules of said molecular weight and $M_i$=the molecular weight of said molecule). Additional work using similarly charged polymers of lower molecular weight (less than 100,000 kDa) demonstrates that the molecular weight significantly impacts the performance of the charged materials and their emulsification ability (see Table 2). Note that the viscosity increases with time and the emulsions appear unstable as water drops out over time.

In Table 2, the Chemical IDs are as follows: Composition 2 is 50/50 Acam/DMAEA-BCQ; Composition 3 is 50/50 Acam/DMAEA-BCQ; Composition 4 is 50/25/25 Acam/DMAEA-BCQ/DMAEA-MCQ; and Composition 5 is 25/75 Acam DMAEA-BCQ.

TABLE 2

Low MW Polymers at 20% Water Cut

| | Chemical ID | | | |
| --- | --- | --- | --- | --- |
| | Composition 2 | Composition 3 | Composition 4 | Composition 5 |
| Dosage (ppm) | 1000 | 1000 | 1000 | 1000 |
| Viscosity (cP) - starting | 3467 | 4907 | 1908 | 5687 |
| Viscosity(cP) - ending | 4043 | 5375 | 3875 | 5771 |
| Comments | Emulsion separation | Emulsion separation | Emulsion separation | |

EXAMPLE 4

Additional testing included evaluation of co-polymers composed of acrylamide and DMAEA-BCQ monomers at a range of different ratios. The results of these tests demonstrate that the polymer composition must contain a sufficient amount of quaternary amine in order to effectively emulsify the oil in water (see Table 3). Both the ratio of nonionic monomer (Acam) to ionic monomer (BCQ and/or MCQ) and the type of ionic monomer (BCQ versus MCQ) affect the performance of the polymer as a viscosity reducer.

The Chemicals tested for the results in Table 3 were as follows: Composition 6 is 60/40 Acam/DMAEA-BCQ; Composition 7 is 75/25 Acam/DMAEA-BCQ; Composition 8 is 50/25/25 Acam/DMAEA-BCQ/DMAEA-MCQ; Composition 9 is 50/50 Acam/DMAEA-BCQ; Composition 10 is 40/20/40 Acam/DMAEA-BCQ/DMAEA-MCQ; and Composition 11 is 40/60 Acam/DMAEA-BCQ.

TABLE 3

Cationic Charge Ratios

| Chemical | Viscosity (cP) | Monomer Ratios (Acam:BCQ:MCQ) |
| --- | --- | --- |
| Composition 6 | 2399 | 60:40:00 |
| Composition 7 | 2819 | 75:25:00 |
| Composition 8 | 2298 | 50:25:25 |
| Composition 9 | 1248 | 50:50:00 |
| Composition 10 | 1740 | 40:20:40 |
| Composition 11 | 5579 | 40:60:0 |

EXAMPLE 5

Figure 2:
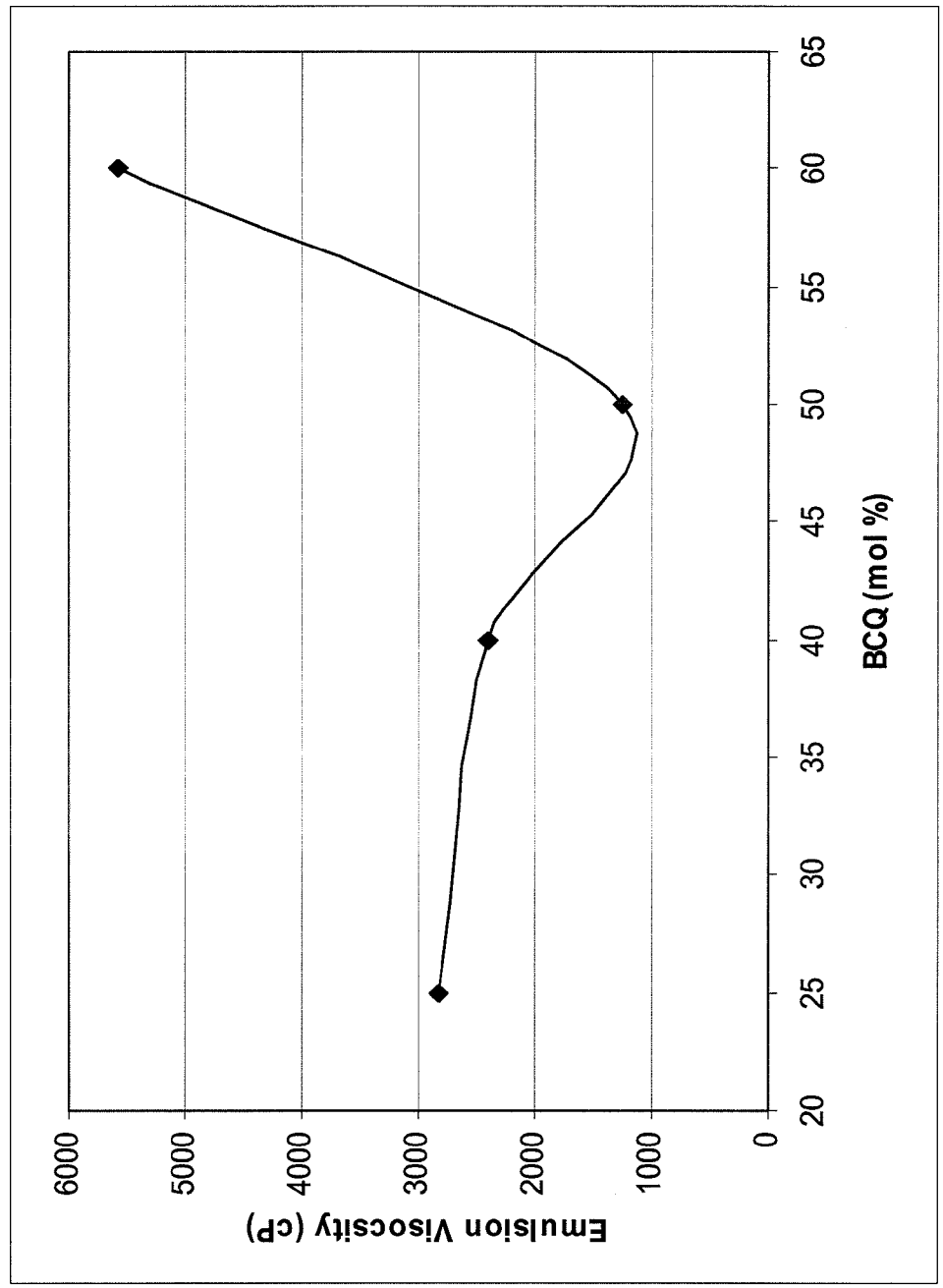
FIG. 2 illustrates how charge density to viscosity ratio reveals a trend of that produces a minimum viscosity at the correct charge ratio.

Not intending to be bound to any particular theory, the apparent viscosity reduction effects of this invention likely have a charge density requirement that allows for optimal performance. The ratio of cationic material to non-ionic material of the polymer allows the polymer to interact at the oil/water interface. This charge to emulsion viscosity ratio is demonstrated in FIG. 2, which reveals a trend of charge density to emulsion viscosity that produces a minimum viscosity at the correct charge ratio. The local minimum emulsion viscosity appears to be approximately 48 mol percent BCQ monomer for these fluids, but can vary with brine salinity and oil composition. In addition, the charge balance effect can also be considered as a balance between the hydrophobic domains (e.g., hydrocarbon chains) in the polymer and hydrophilic domains (e.g., charged moieties) of the polymer.

EXAMPLE 6

Figure 3:
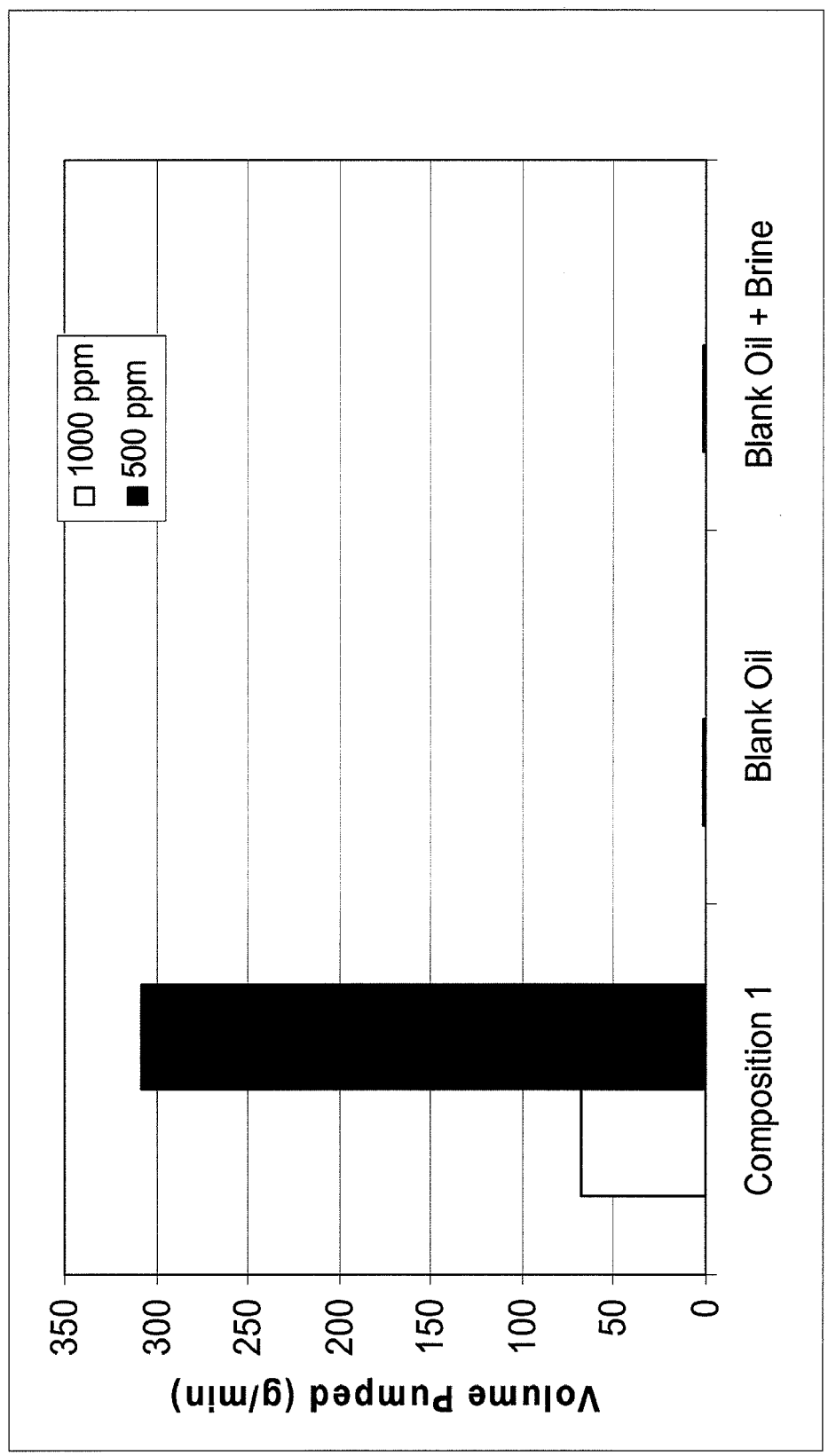
FIG. 3 illustrates how viscosity reduction can enhance production using a simulated flow loop.

To evaluate how viscosity reduction can enhance production, a flow loop was constructed using a reactor vessel to simulate the oil reservoir, tubing connected to a progressing cavity pump followed by additional tubing to simulate the well production annulus, and a check valve to simulate head pressure from produced fluid. The flow loop was then used to evaluate how rapidly oil could be pumped out of the reservoir to a container that could be used to quantify by mass the pumped fluid. Results of these tests are presented in FIG. 3 and as illustrated in the bar graph, the quantity of fluid pumped (or pumpable fluid mass) using the cationic polymer of Composition 1 is substantially higher than that of fluid without chemical treatment, either dry oil or oil and brine.

EXAMPLE 7

Figure 4:
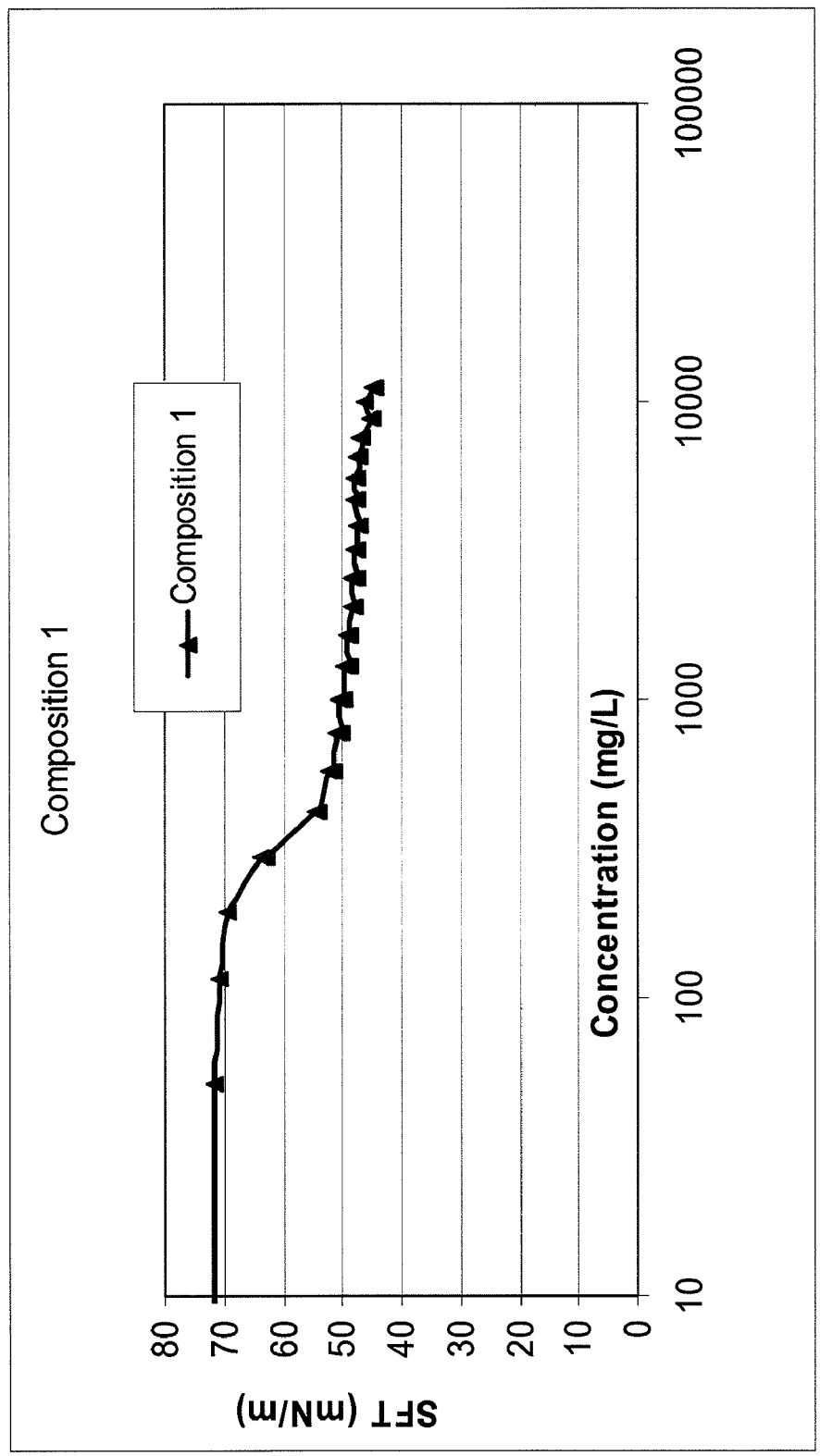
FIG. 4 shows the concentration-dependent measurement of the surface tension of a crude oil treated with the polymer of the invention.

The improved pumpability of the emulsified fluid is likely a result of the water external phase lowering the apparent viscosity. In this example, the conductivity of the bulk fluid was measured. Bulk fluid showed low conductivity (e.g., readings of less than 20 V at 60 mA), whereas oil external emulsions showed very high readings (e.g., in excess of 600 V at 60 mA). The emulsion is formed due to the ability of the cationic polymers to lower the surface tension of the water and allow for a stable droplet to form. The surface tension was measured and confirms a significant surface tension drop (see FIG. 4). The surface tension reduction to below 50 mN/m is believed to be essential for the Composition 1 to perform as a viscosity reducer. Other exemplary polymers having such a characteristic include ter-polymers of Acam, DMAEA-BCQ, DMAEA-MCQ, including the ter-polymer composed of 10% Acam, 50% DMAEA-BCQ, and 40% DMAEA-MCQ.

EXAMPLE 8

After a stable water external emulsion is achieved and the fluid is transported to a processing location, removal of the water from the oil is traditionally accomplished with a combination of heat and demulsifier chemical in a static or very low flow vessel that allows the water and oil to separate into two discrete layers. The use of traditional surfactants has generally interfered with the separation of water from oil, requiring additional demulsifier chemical be used or completely rendering the oil and water inseparable and useless. However, the cationic polymers of the invention have generally provided very good water and oil separation. It is believed that this is in part due to the degradation of the polymer as there is an ester linkage connecting the quat amine to the backbone of the polymer. This linkage can be broken with water via a standard ester hydrolysis mechanism at elevated temperature. Evaluation using an existing demulsification chemical and without chemical treatment both show that the emulsion caused by addition of water and the cationic polymer is readily separated by heating the mixed fluids and that additional chemical is not required to demulsify the fluid (see Table 4). Data in Table 4 illustrates that the cationic polymer (8.8/48143.2 Acam/DMAEA-BCQ/DMAEA-MCQ—Composition 11) will separate water and oil with treatment, but without treatment water is removed more effectively from the Composition 11-stabilized emulsion.

TABLE 4

| | | Water drop with time (%) | | |
| --- | --- | --- | --- | --- |
| Chemical | Demulsifier | 30 min. | 60 min. | 120 min. |
| Composition 11 | None | 0 | 24 | 24 |
| Composition 11 | 500 ppm | 29 | 29 | 29 |

EXAMPLE 9

This Example describes one possible method of synthesizing the polymers of the invention. A reaction vessel was dosed with water (to achieve 50 vol %) before charging with N,N dimethylaminoethylacrylate methylchloride salt (to achieve about 1 to about 10 vol %). Ammonium sulfate and ammonium chloride are then sequentially added, to achieve from about 10 to about 25 vol % and up to about 10 vol %, respectively. After stirring for several minutes, N,N dimethylaminoethylacrylate benzylchloride salt (to achieve about 5 to about 30 vol %) and N,N dimethylaminoethylacrylate methylchloride salt (to achieve up to about 15 vol %) were added. The reaction vessel was heated to 100° F. for one hour before adding an anionic polymer initiator and maintaining the vessel temperature for one hour. After this time, an alkyl peroxide was added and the reaction mixture was stirred for an additional hour before adding sodium metabisulfite, while continuing to maintain vessel temperature. After a final hour, the contents were cooled to room temperature and the polymerization was complete.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein and parent or continuation patents or patent applications, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method for reducing the apparent viscosity of a hydrocarbon fluid encountered in petroleum operations, the method comprising: contacting said hydrocarbon fluid with an effective amount of a composition comprising a ter-polymer comprised of at least one type of non-ionic monomer and at least one type of cationic monomer, wherein the ter-polymer has at least 25 mole percent cationic monomers.

2. The method of claim 1, wherein the ter-polymer further comprises at least one type of cationic monomer including a quaternary ammonium moiety.

3. A method for reducing the apparent viscosity of a hydrocarbon fluid encountered in petroleum operations, the method comprising: contacting said hydrocarbon fluid with an effective amount of a composition comprising at least one polymer having at least 25 mole percent cationic monomers, wherein at least a portion of the cationic monomers are hydrophobically modified cationic monomers.

4. The method of claim 3, wherein the hydrophobic groups are selected from the group consisting of N,N-dimethylaminoethylacrylate quaternary amine salts having benzyl, substituted benzyl, or alkyl chains of $C_4$ or higher.

5. The method of claim 3, wherein the cationic monomers are selected from the group consisting of: dimethylaminoethylacrylate alkyl salts; cationic monomers having four carbons bonded to a single nitrogen to form a quaternary ammonium ion; cationic monomers having two carbons singly bonded to a single nitrogen and one carbon doubly bonded to the nitrogen to form a quaternary imminium ion; cationic amine monomers with a $C_1$ to $C_{24}$ alkyl chain or benzyl salts; and combinations thereof.

6. The method of claim 3, wherein at least a portion of the cationic monomers has the following formula, wherein $R_1$ is H or methyl; $R_2$ is an alkyl or benzyl, and X is any counterion:

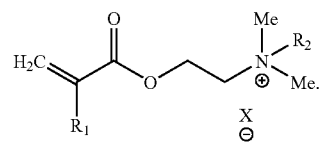

7. The method of claim 6, wherein the benzyl has the following structure, wherein $R_3$, $R_4$, $R_5$, $R_6$, and $R_7$ are independently H or alkyl

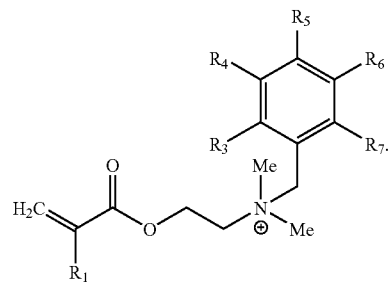

8. A method for reducing the apparent viscosity of a hydrocarbon fluid encountered in petroleum operations, the method comprising: contacting said hydrocarbon fluid with an effective amount of a composition comprising at least one polymer having at least 25 mole percent cationic monomers, wherein the cationic monomer has the following formula, wherein $R_1$ is H or methyl, n is 1 or 2, and X is any counterion

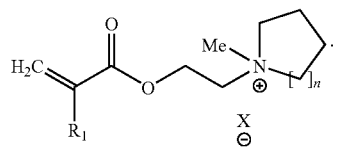

9. A method for reducing the apparent viscosity of a hydrocarbon fluid encountered in petroleum operations, the method comprising: contacting said hydrocarbon fluid with an effective amount of a composition comprising at least one polymer having at least 25 mole percent cationic monomers, wherein the cationic monomer has the following formula, wherein $R_1$ is H or methyl; $R_8$, $R_9$, $R_{10}$, $R_{11}$, and $R_{12}$ are independently H or alkyl; and X is any counterion

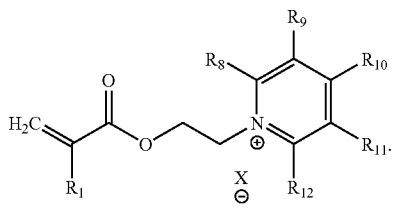

10. A method for reducing the apparent viscosity of a hydrocarbon fluid encountered in petroleum operations, the method comprising: contacting said hydrocarbon fluid with an effective amount of a composition comprising at least one polymer having at least 25 mole percent cationic monomers, wherein the cationic monomer is formed from a nonionic monomer having a charged crosslinked moiety.

11. The method of claim 3, wherein the at least one polymer has the characteristic of lowering surface tension of DI water to below about 50 mN/m.

12. The method of claim 3, wherein the at least one polymer has a weight average molecular weight from about 500,000 kDa to about 10 million kDa.

13. The method of claim 3, wherein the at least one polymer has a weight average molecular weight from about 1 to about 5 million kDa.

14. The method of claim 3, wherein the effective amount of the at least one polymer is from about 10 to about 5,000 ppm, as polymer actives based on total volume of emulsion.

15. The method of claim 3, wherein the effective amount of the at least one polymer is from about 50 to about 500 ppm, as polymer actives based on total volume of emulsion.

16. The method of claim 3, wherein the hydrocarbon fluid is oil and/or gas.

17. The method of claim 1, wherein the at least one type of cationic monomer including the quaternary ammonium moiety comprises at least 25 mole percent of the ter-polymer.

18. The method of claim 3, further comprising converting the hydrocarbon fluid to a reduced apparent viscosity oil-in-water emulsion.

19. The method of claim 18, wherein the reduced apparent viscosity oil-in-water emulsion is a complex water external emulsion.

* * * * *